United States Patent [19]
Powell et al.

[11] 3,987,833
[45] Oct. 26, 1976

[54] BALANCED PNEUMATIC TIRE

[75] Inventors: Joe A. Powell, Norton; Paul C. James, Cuyahoga Falls, both of Ohio

[73] Assignee: The B. F. Goodrich Company, Akron, Ohio

[22] Filed: Aug. 4, 1975

[21] Appl. No.: 601,299

Related U.S. Application Data

[63] Continuation-in-part of Ser. No. 494,765, Aug. 5, 1974, abandoned.

[52] U.S. Cl. ............................ 152/330 R; 152/347; 156/75
[51] Int. Cl.² .................... B60B 13/00; B60C 5/00
[58] Field of Search ................ 152/330 R, 346, 347, 152/330 L; 301/5; 117/95; 156/75

[56] References Cited
UNITED STATES PATENTS

| | | |
|---|---|---|
| 2,193,734 | 3/1940 | MacCracken .......................... 156/75 |
| 2,935,109 | 5/1960 | Railsback ............................ 152/347 |
| 3,361,698 | 1/1968 | Pace .................................... 152/347 |
| 3,463,551 | 8/1969 | Clay ...................................... 301/5 |
| 3,739,829 | 6/1973 | Powell et al. ................... 152/330 R |
| 3,747,660 | 7/1973 | Tibbals ........................... 152/330 R |

Primary Examiner—Drayton E. Hoffman
Attorney, Agent, or Firm—W. A. Shira, Jr.

[57] ABSTRACT

A pneumatic tire is balanced by applying a counterbalance material to the tire characterized in that the balancing material is a thin layer of a polyolefin which adheres to the inside surface of the carcass by means of surface tension alone.

11 Claims, 2 Drawing Figures

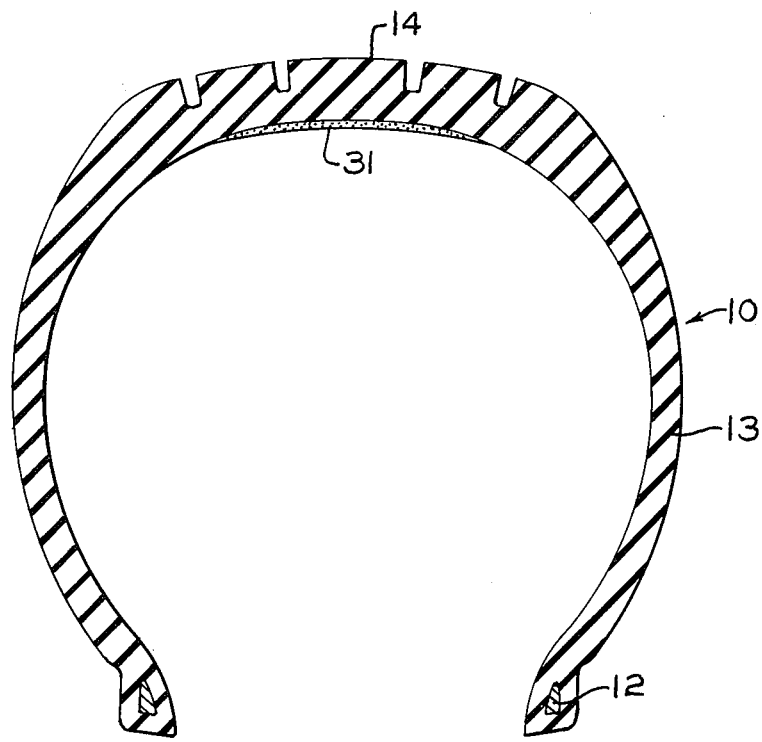
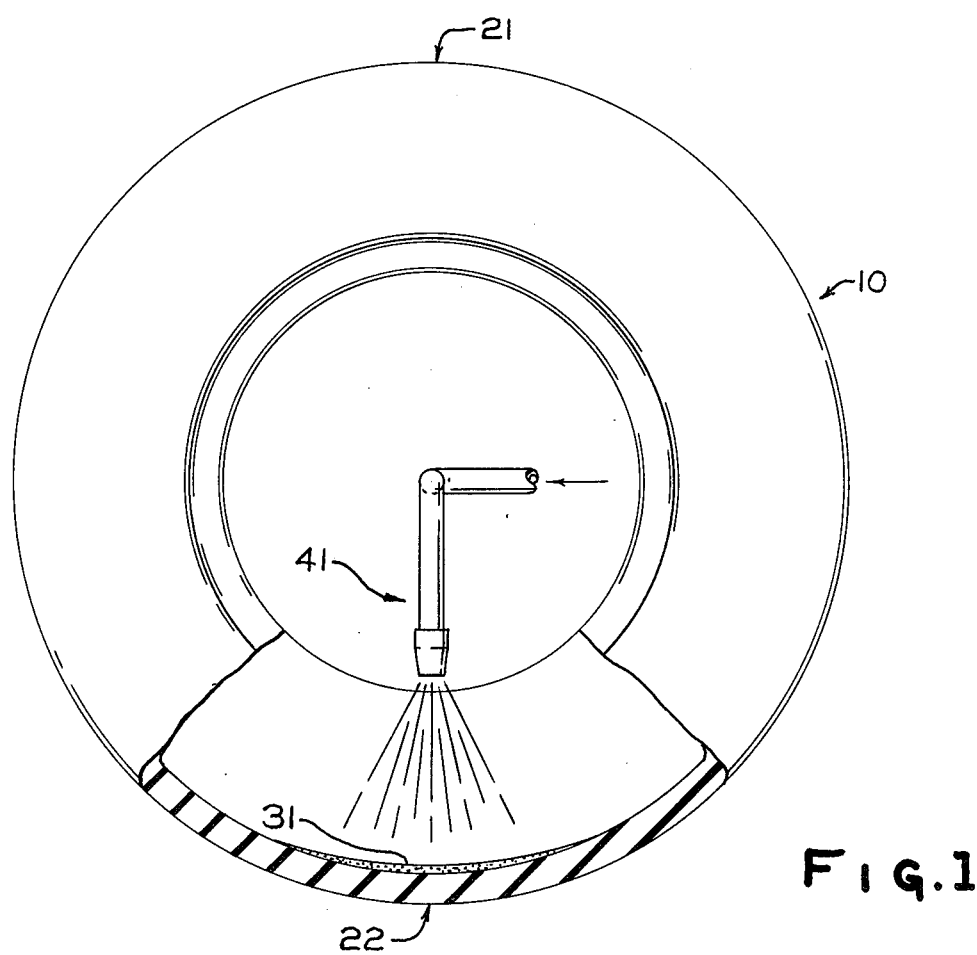

BALANCED PNEUMATIC TIRE

This invention is a continuation-in-part of copending U.S. application Ser. No. 494,765, filed Aug. 5, 1974 now abandoned.

BACKGROUND OF THE INVENTION

This invention relates to pneumatic tires and more particularly to balancing of pneumatic tires.

One current method of correcting weight unbalance of pneumatic tires is to apply either a rubber cement containing loading material or balance pads to the inside surface of the tire carcass. Since both of these methods require a chemical bond between the balancing material and the interior surface of the tire, the surface to which the material is applied must be prepared by either a thorough solvent washing or a combination of washing and buffing. Because the surface is difficult to clean, the bond between the balance material and the tire is not always satisfactory and tends to break down after the tire has been used for a period of time. This permits the material to shift position resulting in mass unbalance.

SUMMARY OF THE INVENTION

The present invention comprises a tire having, and a method of applying, a substance having the consistency of heavy grease over about 30° to 60° of the inside surface of the tire centered on the lightest part of the tire as determined by a measurement of the static unbalance. The substance comprises a low molecular weight polyolefin homopolymer or copolymer, having a high viscosity at normal tire operating temperature of up to about 165° F. and a lower viscosity at application temperatures above about 165°. The substance can be combined with finely divided particles of a material of greater specific gravity, such as lead or compounds thereof, in order to decrease the volume of material needed to balance the tire.

A major advantage of this invention is that no chemical bond is needed between the inner surface of the tire and balancing substance. Rather, the balancing substance is held in place by its high surface tension cohesive force with the rubber of the tire interior. Since no chemical bond is needed, the tire can be balanced without surface preparation of the innerliner, thus lowering the cost of balancing tires.

Another advantage of this invention is that the balancing material contemplated in this invention tends to stay in place throughout the life of the tire. This is in contrast to the loaded rubber cement and balance pads heretofore used which have been known to break away from the tire interior after a period of use, probably as the result of a defective chemical bond between the balancing material and the tire innerliner. Since chemical bonds are not relied upon in the present invention, the balance material stays in place throughout the life of the tire.

THE DRAWINGS

FIG. 1 is a fragmented side elevation of a tire showing the balancing material in place in the tire and also diagrammatically illustrating a spray application apparatus; and, FIG. 2 is a cross section taken through a tire of the present invention.

DETAILED DESCRIPTION

A conventional pneumatic tire casing 10, having beads 12, sidewalls 13, and crown portion 14, is placed on a static balance testing machine in order to determine the area of maximum unbalance 21. As is well understood the light spot 22 of the casing is removed 180° circumferentially from the area of maximum unbalance. A counterbalancing material 31 embodying the present invention is axially evenly distributed in a smooth layer upon the interior surface of the casing in the region centered over the light spot 22 of the tire. The counterbalancing material may be applied in a solid state by means of a hand tool such as a spatula, or may be applied in a fluid state by means of a spray apparatus 41. This counterbalancing material comprises a low molecular weight polyolefin, homopolymer or copolymer, having a high viscosity at normal tire operating conditions (approximately 140° F.) and a lower viscosity at spray application temperatures. This material has the consistency of a stiff grease at room temperatures and does not liquify nor flow within the tire when warmed to normal tire operating temperatures. It will not crack nor peel when cold, but will flex with the tire under normal operating conditions. If desired a relatively heavy substance in finely divided particle form may be incorporated in the material so as to augment its weight, thus reducing the volume of material necessary to balance the casing.

A preferred type of polyolefin polymer used as the counter balancing substance are poly α-monolefin, homo- and co-polymers, i.e. polymers of monolefin monomers containing two to about 14 carbon atoms such as ethylene, propylene, isobutylene, 1-butene, 1-hexene, and the like, and mixtures of these monomers.

One preferred substance used as the counterbalancing material is a polypropylene composition. A typical composition may be purchased from the Eastman Chemical Company and is marked under the name of Epoline M-85. Another preferred substance is a polyethylene composition. A typical polyethylene composition may be purchased from the Allied Chemical Company under the name of Polyethylene Ac 1702. After either of these preferred substances is heated to a suitable application temperature it may be applied to the inside of the tire by hand or by spraying. The degree of heating required depends upon the substance and method of application chosen.

For example, the polypropylene composition should be spray applied when its viscosity is in the range of 1000 to 50 centipoise, which is attained by heating the substance to temperatures from 240° F to 400° F. A viscosity of about 1000 centipoise which is reached at about 240° is preferred. If a hand application with a spatula or other suitable spreading tool is chosen, the polypropylene composition should be in the range of 20,000 to 1,000 centipoise, thereby requiring temperatures of from 190° F to 240° F. A 20,000 centipoise viscosity at about 190° F is preferred.

Using a polyethylene composition a viscosity in the range of 4000 to 150 centipoise is desirable for spray application, thereby requiring a temperature of from 160° to 180° F. A viscosity of about 4000 centipoise attained at about 160° F is preferred. If a hand application is chosen the polyethylene composition should be in the range of 20,000 to 4,000 centipoise, which are attained at temperatures of from 120° F to 160° F. The 20,000 centipoise viscosity at about 120° F is preferred.

It will be noted that in order to obtain the aforementioned viscosities at the stated temperatures, a predetermined molecular weight is required. For example, the polyethylene composition should have a weight averaged molecular weight in the range of 500 to 3,000, preferably about 1200.

Regardless of the method of application chosen, each of the aforementioned preferred substances will cool down and become nearly solid at normal room temperatures. When a polyethylene composition reaches a normal tire operating temperature of about 160° F, it will have a viscosity of about 4000 centipoise. At this temperature, the polyethylene composition will retain essentially a thick grease consistency and will, thereby, resist flow within the tire. A polypropylene composition will retain a more viscous consistency at a normal tire operating temperature of about 160° F. At this temperature its resistance to flow is substantial while its flexing properties are still sufficient to resist cracking or breaking of surface tension between the substance and the inner tire carcass.

The polypropylene or polyethylene may be used alone or, as indicated above, a number of different substances may be added to the polyethylene to increase the weight per unit volume of the counterbalancing composition. These substances, which should be in finely divided form, may be lead or other metal oxides, minerals or derivatives thereof which do not chemically alter the polypropylene or polyethylene at the temperatures of application or use in such a way as to alter the surface tension characteristics and other grease-type properties essential to the use as a balancing material in a tire. Examples of such materials are finely divided lead, zinc, zinc oxide, barium sulphate, lead sulphate, etc., or any suitable combinations thereof.

To practice the method, a vehicle pneumatic tire is first tested on balancing apparatus, which is well known in the art, in order to locate the amount and area of maximum unbalanced. Once this is done, a counterbalancing material, polyethylene, for example, is applied to the interior of the tire, at a location 180° circumferentially from the area of maximum unbalance. Application is preferably accomplished by heating the material to between about 160° to 180° F. so that it is in a liquid state and can be applied by spraying. However, the material may be applied at room temperature by manual spreading. The application is preferably effected over an area of about 45° of the circumference of the inside surface of the carcass, the area being centered on the light spot and the application is effected substantially in the crown region 14 of the tire. After cooling, the polyethylene has the consistency of a thick grease or wax and will adhere to the inside surface of the tire by means of contact surface tension with the rubber of the inner surface such as the innerliner for a tubeless tire.

Alternatively, other counterbalancing materials may be used. Using polypropylene, for example, application is preferably accomplished by heating the material to about 240° F so that it is in a liquid state and can be applied by spraying. Alternatively, the polypropylene may be heated to about 190° F. whereupon it becomes a soft grease and can be applied by manual spreading. After cooling, the polypropylene has the consistency of a thick grease or wax and will adhere to the inside surface of the tire by means of contact surface tension with the inner surface.

The amount of counterbalancing material to be used depends on the amount of unbalance of the tire. For instance, 2 ounces of the material applied in a manner specified above will correct 28 inch ounces of unbalance. Two ounces of a polypropylene or polyethylene material without additives corresponds to a volume of about 60 cc. This volume can be reduced by a substantial amount by loading the material with a heavy pigment such as zinc oxide or lead oxide. For example, if equal weights of zinc oxide and polypropylene or polyethylene are used the volume of the resulting composition is about half of the original volume. The advantage of a loaded balancing substance is that the surface tension of the substance improves as the thickness of the applied layer decreases.

The above-described method and material provides a very satisfactory counter-weighted area within the casing having a smooth, evenly distributed surface which will not crack, chip or peel off.

Although the foregoing article and method, along with particular compositions, have been described for the purpose of illustrating a presently preferred embodiment of the invention, it should be understood that many modifications or alterations may be made without departing from the spirit and scope of the invention as set forth in the appended claims.

We claim:

1. The method of balancing a tire which has a nonuniform distribution of weight comprising:
   a. determining the location of maximum unbalance on the tire;
   b. determining the amount of the maximum unbalance of the tire; and
   c. applying a thin layer of polyolefine material, the material capable of attaining a viscosity of at least 20,000 centipoise at a given temperature between 120° F and 400° F, over an area of about 30° to 60° of the inner periphery of the tire centered on the area essentially 180° from the area of maximum unbalance of the tire, wherein the thin layer of material is of sufficient mass to counterbalance the amount of unbalance in the tire, and wherein the thin layer of material at normal tire operating temperatures adheres to the area of the inner periphery of the tire essentially solely by surface tension.

2. The method as defined in claim 1 further comprising the step of preheating the polyolefin material before applying the polyolefin material to the tire.

3. The method defined in claim 1 wherein the polyolefin material comprises polypropylene.

4. The method defined in claim 1 wherein the polyolefin material comprises polyethylene.

5. In a pneumatic tire with a prelocated circumferential zone indicating an area of maximum unbalance, the improvement wherein the tire has a thin layer of a polyolefin material, the material capable of attaining a viscosity of at least 20,000 centipoise at a given temperature between 120° F and 140° F, over a circumferential area of about 30° to 60° of the inner periphery of the tire centered on the area essentially 180° from the area of maximum unbalance of the tire, wherein the thin layer of material is of sufficient mass to counterbalance the amount of unbalance in the tire, and wherein the thin layer of material at normal tire operating temperatures adheres to the area of the inner periphery of the tire essentially solely by surface tension.

6. The tire defined in claim 5 wherein the polyolefin material comprises a quantity of relative heavy material in the form of finely divided particles to augment the weight of the material.

7. The tire defined in claim 5 wherein the polyolefin material comprises a poly$\alpha$-monolefin.

8. The tire defined in claim 7 wherein the tire polyolefin material comprises polypropylene.

9. The tire defined in claim 7 wherein the tire polyolefin material comprises polyethylene.

10. The tire defined in claim 5 wherein the polyolefin has a viscosity of about 4000 centipoise or more at temperatures of about 160° F or less.

11. The tire defined in claim 5 where the polyolefin has a viscosity of 20,000 centipoise or less at temperatures of about 190° F or greater.

* * * * *

UNITED STATES PATENT OFFICE
CERTIFICATE OF CORRECTION

PATENT NO. : 3,987,833
DATED : October 26, 1976
INVENTOR(S) : Joe A. Powell and Paul C. James It is certified that error appears in the above-identified patent and that said Letters Patent are hereby corrected as shown below:

Column 4, line 36, before "polyolefine" insert ---a---;
Column 4, line 36, change "polyolefine" to ---polyolefin---;
Column 5, line 2, change "relative" to ---relatively---.

Signed and Sealed this

Fourth Day of January 1977

[SEAL]

Attest:

RUTH C. MASON
*Attesting Officer*

C. MARSHALL DANN
*Commissioner of Patents and Trademarks*